United States Patent Office 3,589,999
Patented June 29, 1971

3,589,999
DEIONIZATION PROCESS
Wayne A. McRae, Lexington, and William E. Katz, Weston, Mass., assignors to Ionics, Incorporated, Watertown, Mass.
No Drawing. Filed Oct. 25, 1968, Ser. No. 770,795
Int. Cl. B01d 15/04
U.S. Cl. 210—28
12 Claims

ABSTRACT OF THE DISCLOSURE

The invention is directed to the deionization of water by employing cation exchange resins in the alkaline earth form such as calcium and anion exchange resins in the carbonate form. The calcium and carbonate ions released from the resin during the deionization process precipitates out as insoluble calcium carbonate to give an effluent from the resin exchanger of potable water. Regeneration of the resins back to their initial ionic form may be accomplished in a mixed bed without the necessity of separating the resins. Regeneration is performed by contacting the bed with a lime slurry, rinsing free of unabsorbed calcium and hydroxide ions and then treating with $CO_2$ to carbonate the anion resin. The resin is then ready for another deionization cycle.

---

This invention concerns ion exchange processes for removing ions from solutions containing minor amounts of dissolved ionized substances, such solutions including brackish water, irrigation runoff, sewage effluents, industrial process streams, e.g. sugar syrups. More particularly, the present invention is directed to a deionization process which employs beds of cation exchange and anion exchange resins in the alkaline earth and carbonate forms respectively whereby regeneration of said resin exchangers may be effected without prior separation thereof. Processes for demineralizing water by employing strongly acidic cation exchange resins in the hydrogen form and subsequently contacting the resulting low pH water with anion exchange resins in the base or bicarbonate form are well known in the prior art. Such processes are used for the production of deionized water for laboratory, pharmaceutical and boiler uses, generally from a source of potable water. For water solutions of appreciable electrolyte content, three problems arise:

(1) the cost of regenerant chemicals rises to uneconomic levels (such regenerants are usually sulfuric acid and caustic though ammonia or lime are sometimes used in place of caustic);
(2) the disposal of the spent regenerant stream becomes a serious pollution problem; and
(3) the comparatively large volume of deionized or raw water necessary to rinse the resins prior to use becomes uneconomical.

Other well known demineralization processes comprise contacting an aqueous solution with a strongly basic anion exchange resin in the hydroxide or bicarbonate form, and subsequently contacting the resulting high pH solution with acidic cation exchange resin in the hydrogen form. The process is not often used commercially and has all the disadvantages noted above including others of its own.

Another known process involves contacting a solution with a mixed bed cation exchange resin in the hydrogen form and anion exchange resin in the base or bicarbonate forms. The reactions are essentially as follows:

(a) $\quad M^+ + R^-H^+ \rightarrow H^+ + R^-M^+; \quad K \sim 1$
(b) $\quad X^- + R^+OH^- \rightarrow OH^- + R^+X^-; \quad K \sim 1$
(c) $\quad H^+ + OH^- \rightarrow H_2O; \quad K = 10^{14}$ Where:

$M$ = Cation such as $Na^+$
$X$ = Anion such as $Cl^-$
$R^-$ = Cation resin
$R^+$ = Anion resin
$K$ = Equilibrium constant Thus it is readily seen that the driving force for the exchange comes from the $H^+$ and $OH^-$ scavenging reaction (c). Deionization by such a process is highly efficient and would be quite desirable if it were not for the economic disadvantages listed above. In addition it is necessary to separate the resins before they can be regenerated.

In view of the above it becomes an object of this invention to provide a simple, efficient and economical method of demineralizing aqueous fluids such as water.

A specific object of the invention is to effect the demineralization of aqueous liquids by ion exchange in a mixed bed of cation and anion erchange resins wherein no separation of said resins is required to regenerate the exhausted resin.

Yet another object of said invention is to provide a method for the demineralization of aqueous fluids involving the use of ion exchange technology which overcomes most of the disadvantages of the prior art as noted hereinabove.

Other objects will appear hereinafter.

In accordance with this invention a method has been discovered whereby the ion exchange deionization reaction is effected with a cation exchanger in the alkaline earth (e.g. $Ca^{++}$) form and an anion exchanger in the carbonate ($CO_3^=$) form. This type of demineralization is effected most efficiently and economically and all the disadvantages known in the prior art are wholly overcome or at least minimized. The cyclic reactions that take place are essentially as follows:

(d) $\quad 2M^+ + R_2 = Ca^{++} \rightarrow Ca^{++} + 2R^-M^+; \quad K \sim 0.1$
(e) $\quad 2X^- + R_2^{++}CO_3^= \rightarrow CO_3^= + 2R^+X^-; \quad K \sim 0.1$
(f) $\quad Ca^{++} + CO_3^= \rightarrow \underline{CaCO_3 \downarrow}; \quad K \sim 10^{7.7}$ Reaction (f) is the scavenging reaction to remove $Ca^{++}$ and $CO_3^=$ from solution. Such a scavenging reaction is required since the resin equilibria generally favor the $Ca^{++}$ and $CO_3^=$ forms of the resins. The solubility of $CaCO_3$ is about 15 p.p.m. at pH's greater than about 7; thus the effluent form the exchangers is potable water. The $CaCO_3$ is of course, a precipitate and it is therefore desirable to run the bed in which it precipitates in a turbulent mode, for example, up-flow, stirred batch, moving bed and the like to free the precipitate from the resin. Preferably the exchange takes place in a mixed bed of $Ca^{++}$ and $CO_3^=$ form resins though alternate schemes are possible.

The regeneration of both the cation and anion resins to the $Ca^{++}$ and $CO_3^=$ forms respectively is accomplished by reacting the mixed bed with a lime slurry as follows:

(g) $2R^-M^+ + 2R^+X^- + Ca(OH)_2 \rightarrow$
$\qquad R_2 = Ca^{++} + 2R^+OH^- + 2M^+ + 2X^-$ It will be apparent that there is no reason to separate the resins in the mixed bed as is required in the usual mixed bed deionization in which regeneration of the cation exchanger requires acid and that of the anion exchanger requires alkali although if desired the cation and anion exchangers may be used in separate columns. The excess lime slurry is removed from the bed by mechanical means, e.g. screening, gravity separation, back rinsing etc.; the bed is rinsed substantially free of unabsorbed Ca++ and OH− ions and the resin is then carbonated as follows, preferably with agitation;

(h) $R_2=Ca^{++}+2R^+OH^-+CO_2 \rightarrow R_2=Ca^{++}+R_2^{++}Co_3^=+H_2O$

The resin many be ready for a second deionization cycle.

Alternatively the deionization and carbonation may be carried out simultaneously as follows in a mixed bed or in separate beds:

(i) $2M^++2X^-+R_2=Ca^{++}+2R^+OH^-+CO_2 \rightarrow \underline{CaCO_3}\downarrow 2R^-M+X^-H_2O$ that is, the $CO_2$ may be bled in with the saline feed water. Control is exercised by feedback from the pH of the effluent from the mixed bed, i.e., 9>pH>7. Alternatively the feed water may pass first through the anion exchanger, be carbonated and then pass through the cation exchanger as follows:

(j) $2M^++2X^-+2R^+OH \rightarrow 2R^+X^-+2M^-+2OH^-$ (k) $2M^++2OH^-+CO_2 \rightarrow 2M^++CO_3^=+H_2O$ (l) $2M^++CO_3^=+R_2=+Ca^{++}\underline{CaCO_3}\downarrow+2R^-M^+$ In this case the carbonation may consist of simultaneously feeding the effluent from the anion exchanger and the requisite amount of $CO_2$ into cation exchanger. During anion exchanber and/or carbonation some precipitates may be formed which are preferentially removed before cation exchanger.

As a second alternative, the anion exchanger in the (OH−) from may first be carbonated as follows:

(m) $2R^+OH^-+CO_2 \rightarrow R_2^{++}CO_3^=+H_2O$ (n) $R_2^{++}CO_3^=+2M^++2X^- \rightarrow 2R^+X^-+2M^++CO_3^=$ (Any precipitates, e.g. $CaCO_3$ may be removed at this point.)

(o) $2M^++CO_3^=+R_2=Ca^{++} \rightarrow \underline{CaCO_3}\downarrow+2R^-M^+$

In either case the regeneration is carried out solely with a lime slurry. It will be understood that regeneration of the cation exchanger is quite efficient with lime slurry since the resin prefers to be in the divalent form. A suitable resin for the anion exchanger is Amberlite IRA410 made commercially by the Rohm & Haas Company of Philadelphia, Pa., though many other anion exchangers are also suitable. It will be further understood that the ratio of cation to anion exchanger may be adjusted to take into account the presence of Ca++ in the feed water, i.e., it is not necessary to provide cation capacity for the Ca++ content which will be removed by precipitation with exchanged $CO_3^=$ from the anion exchanger. In most brackish waters at least part of the Mg++ will be removed by the cation exchanger and will not precipitate as the hydroxide.

It should also be noted that if there is some build up of $CaCO_3$ precipitate in the bed in each cycle (that is, not all of the $CaCO_3$ can be removed mechanically) which interferes with the operation of the bed, then it may be necessary to supercarbonate periodically as follows:

(p) $CaCO_3+H_2O+CO_2 \rightarrow Ca(HCO_3)_2$

The reaction product (calcium bicarbonate) is quite soluble and can be removed from the bed in this way in a concentrated stream. Alternatively the interfering residual $CaCO_3$ precipitate may be removed with muriatic or nitric acids, e.g.

(q) $CaCO_3+2HX \rightarrow Ca^{++}+H_2O+CO_2\uparrow$

Such a supercarbonation step could be used in each cycle to remove all of the residual calcium carbonate as $Ca(HCO_3)_2$, if desired, in a saturated solution thereof. The $CO_2$ can be removed by heating and recycled. At any rate the only waste product other than the salts removed from the water is solid limestone which can be disposed of or recycled after thermal decomposition (slaking) into CaO and $CO_2$ in the well known manner, e.g.

(r) $CaCO_3 \xrightarrow{heat} CaO + CO_2\uparrow$

The primary advantage of the process is the use of low cost regenerating materials, e.g. $Ca(OH)_2$ and $CO_2$. Preferred apparatus for carrying out the process of the present invention are commercially available and include for example the pulsed flow Higgins contactor of Chemical Separations Co. (Oak Ridge, Tenn.), the continuous flow ion exchangers of Asahi Chemical Industries (Tokyo, Japan), Graver Water Conditioning Co. (Union, N.J.), Degremont-Cottrell, Inc. (Bound Brook, N.J.), and Permutit Co. (Paramus, N.J.) and other well known continuous or semi-continuous apparatus. In large plants it is probably advantageous to thermally decompose the $CaCO_3$ into CaO and $CO_2$ to be recycled to the process.

It is to be understood that while the present invention has been described with specific application of $CaCO_3$ as the scavenging agent, $SrCO_3$ and $BaCO_3$ are included as similarly applicable.

EXAMPLE 1.—$CaCO_3$ AS THE SCAVENGING AGENT

To illustrate the advantages of the present invention, the following experiments are run.

Part A

A laboratory scale version of a conventional two column brackish water ion exchange demineralization system is constructed. One column has a total volume of about 1500 milliliters and contains about 750 milliliters of sulfonated crosslinked polystyrene cation exchange resin marketed by the Rohm and Haas Company (Philadelphia, Pa.), under the trade name Amberlite 1R120. The resin is initially in the hydrogen form. The second column has a volume of about 2000 milliliters and contains about 1000 milliliters of anion exchange resin based on crosslinked polystyrene, containing quaternary ammonium groups and marketed by the Rohm and Haas Company (Philadelphia, Pa), under the trade-name Amberlite 1RA–410. The resin is initially in the free base form. A representative, synthetic brackish water is prepared having the approximate composition of 20 to 1 diluted sea water by dissolving 53 grams of sodium chloride, 10 grams of magnesium chloride, 8 grams of magnesium sulfate and 2 grams of calcium chloride in 10 gallons (38 liters) of water. This synthetic brackish water is passed down flow at a rate of about 400 milliliters per minute, first through the cation exchanger and then through the anion exchanger. The system is judged to be exausted when the average conductivity of the combined effluent from the anion exchanger exceeds 1250 micromhos per centimeter at 25° C. This occurs when about 43 liters of water have collected.

Part B

The resin beds are then individually blown free of liquid water by a downward stream of air. The cation exchange resin is regenerated by passing about 2 liters of about 1 normal sulfuric acid down flow through the resin at a rate of 100 milliliters per minute followed by an additional 6 liters of water. The bed is then blown free of liquid water in the interstices by a downward stream of air. The anion exchange resin is regenerated in a known way by passing about 6 liters of a 4 percent slurry of hydrated lime up flow at such a rate that the resin bed is expanded sufficiently to permitt substantially all of the particulate matter in the slurry to pass through the bed. We have found that at room temperature a flow rate of about 10 milliliters per minute per square centimeter of cross-sectional area is adequate through occasional brief excursions to 10 or 20 milliliters per minute per square centimeter seen to help if the slurry contains some coarse particles.

The excess hydrated lime may be recovered from the effluent by centrifugation, filtration or even settling (if the particles are fairly coarse) and reused in a subsequent regeneration. The effluent should be processed for such recovery as soon as it issues from the column. The resin is drained and then rinsed upflow at the same flow rate with about 6 liters of water. The bed is then blown free of liquid water in the interstices by a downward stream of air and is then ready for reuse. The synthetic brackish water is again passed downflow at a rate of about 400 milliliters, first through the cation exchanger and then through the anion exchanger. The system is judged to be exhausted when the average conductivity of the combined effluent from the anion exchanger, after first decreasing, rises to more than 1250 micromhos per centimeter at 25° C. This occurs when about 39 liters of water are collected. Thus volume is judged to be satisfactory since the regeneration cycle was not intended to completely regenerate the resins.

Part C

The anion exchange resin is regenerated as described above in Part B and in accordance with the present invention the effluent slurry is then passed upflow through the cation exchanger at such a rate that the resin bed is expanded sufficiently to permit substantially all of the particulate matter in the slurry to pass through the bed. We have found that at room temperature a flow rate of about 20 milliliters per minute per square centimeter of cross-sectional area of the cation exchange column is adequate though occasional brief excursions to 25 or 30 milliliters per minute per square centimeter seem to help if the slurry contains some coarse particles. The excess hydrated lime may be recovered from the effluent from the cation exchanger by immediately centrifuging, filtering or settling (if the particles are fairly coarse) and may be reused in a subsequent regeneration. The anion resin is drained and reused upflow with about 6 liters of water at a rate of about 10 milliliters per minute per square centimeter with occasional bursts to 15 or 20 and the effluent is used to rinse the drained cation exchanger upflow at a rate of about 20 milliliters per minute per square centimeter with occasional bursts to 25 or 30. More rinse water may be used if desired but this procedure is adequate and it will be seen saves about half of the rinse water required when the cation exchanger is regenerated with acid. The cation resin is purged of water in the interstices by a down blast of air but the anion resin is allowed to remain immersed and is then converted to the carbonate form by passing carbon dioxide gas upflow at a rate of about 1 liter per minute (which is sufficient to violently fluidize the bed) until the difference between total inlet and total oulet flows indicates that approximately 26 liters of carbon dioxide gas (100% basis measured at 72° F.) have been absorbed. The amount of carbon dioxide gas is calculated to be approximately stoichiometrically sufficient to convert to carbonate substantially all of the hydroxide groups actually present in the column. The anion and cation resins are then mixed together and transferred to a third column having a total capacity of about 3.5 liters. The mixed bed is allowed to remain filled with water. The synthetic brackish water is again passed upflow at such a rate that the resin bed is expanded sufficiently to permit a substantial fraction of the calcuim carbonate formed to pass through and out of the bed. We have found that at room temperature a flow rate of about 20 milliliters per minute per square centimeter is adequate though occasional brief excursions to 25 or 30 milliliters per minute appear to release some of the calcium carbonate. The system is judged to be exhausted when the average conductivity of the combined effluent rises to more than 1250 micromhos per centimeter at 25° C. This occurs when about 38 liters of water have been collected. The product water and the calcium carbonate are separated by setting (decantation, centrifugation, filtration or the like. If desired part of the product may be recycled to the column with an upflow of air at a rate of about 1 liter per minute to scrub the resin. Alternatively additional brackish water is recycled upflow through the resin with an upflow of carbon dioxide at a rate of about 1 liter per minute to solubilize any remaining calcium carbonate which is removed with the brackish water. The resin may then be blown free of interstitial water.

Part D

The mixed bed resin is then regenerated upflow with hydrated lime or if desired first converted to the mixed sodium and chloride forms with a salt brine. The regeneration is accomplished upflow with about 6 liters of a 4 percent slurry of hydrated lime at such a rate that the resin bed is expanded sufficiently to permit substantially all of the particulate matter in the slurry to pass through the bed. We have found that at room temperature a flow rate of about 20 milliliters per minute per square centimeter of cross-sectional area is adequate though occasional excursions to 25 to 30 milliliters seem to help if the slurry contains some coarse particles. As before the excess hydrated lime may be recovered from the effluent by immediate centrifugation, filtration or settling and reused in a subsequent regeneration. The resin is drained and then rinsed upflow at the same flow rate with about 6 liters of water. The mixed resin is left covered with water and the anion portion of the bed is then converted to the carbonate form by passing carbon dioxide gas upflow through the mixed resin until the difference between the amount fed and amount effluent indicates that about 26 liters (100% basis measured at 72° F.) have been absorbed. The flow rate is about 1 liter per minute, sufficient to fluidize the resin violently. The amount of carbon dioxide gas is calculated to be approximately stoichiometrically sufficient to convert to carbonate substantially all of the hydroxide groups actually present in the column. There is sometimes some stratification of the resins and if so they are remixed and allowed to remain filled with water. The synthetic brackish water is again passed unflow at such a rate that the resin bed is expanded sufficiently to permit a substantial fraction of the calcium carbonate formed to pass through and out of the bed. At room temperature a flow rate of about 20 milliliters per minute per square centimeter is adequate, although occasional brief excursions to 25 or 30 milliliters per minute appear to help release some of the calcium carbonate. The point at which the average conductivity of the combined effluent rises to more than 1250 micromhos per centimeter at 25° C. is taken as the point of exhaustion. This occurs when about 38 liters of water have been collected. The effluent water is separated from the calcium carbonate. The column is purged from residual calcium carbonate as described in Part C.

These results are summarized substantially as follows:

| Part | Regenerants | Volume, liters | | |
| --- | --- | --- | --- | --- |
| | | Regenerants | Rinse | Product |
| A | None | (1) | None | 43 |
| B | Ca(OH)+H$_2$SO$_4$ | 8 | 12 | 39 |
| C | Ca(OH)$_2$ | 6 | 6 | 38 |
| D | Ca(OH)$_2$ | 6 | 6 | 38 |

1 New resin.

It will be seen that Parts C and D, performed according to the teaching of this invention are superior to Part B, the conventional process, since smaller total volumes of a single low cost regenerant are used, less rinse water is required and the volume of product is only slightly reduced.

EXAMPLE 2.—SrCO$_3$ AS THE SCAVENGING AGENT

Part A

About 500 milliliters of hydrogen form crosslinked carboxylic type weakly acid cation exchange resin marketed by the Permutit Co. (Paramus, N.J.) under the tradename Permutit H-70 are placed in a column having a total volume of about 1000 milliliters. About 1090 milliliters of a hydroxide form anion exchange resin based on crosslinked polystyrene, containing quarternary ammonium active groups and marketed by Diamond Shamrock Co. (Redwood City, Calif.), under the trade-name Duolite A-40 are placed in a column having a total volume of about 2000 milliliters. A synthetic brackish water prepared in accordance with Example 1, Part A is passed downflow at a rate of about 100 milliliters, first through the anion resin and then through the cation exchange resin. As in Example 1, the system is judged to be exhausted when the average conductivity of the combined effluent from the cation exchanger exceeds about 1250 micromhos per centimeter at 25° C. This occurs when about 41 liters of water have been collected. This procedure illustrates the known process of using a weakly acid cation exchanger and a strongly basic anion exchanger for demineralizing water.

Part B

The resin beds are then individually blown free of liquid water by a downward stream of air. The cation exchange resin is regenerated by passing about 6 liters of a 6.5 percent (as $Sr(OH)_2$) slurry of strontium hydroxide powder up flow at such a rate that the resin bed is expanded sufficiently to permit substantially all of the particulate matter in the slurry to pass through the bed. We have found that at room temperature a flow rate of about 10 milliliters per minute per square centimeter of cross-sectional area is adequate though occasional brief bursts to 15 or 20 milliliters seem to help if the slurry contains some coarse particles. The effluent from the cation exchanger is passed upflow through the anion exchanger at the same specific areal flow rate. The excess strontium hydroxide is recovered from the effluent by centrifugation, filtration or settling and reused in a subsequent regeneration. The effluent should be processed for such recovery as soon as it issues from the anion exchanger. The columns are then allowed to drain and the cation exchanger is rinsed upflow at the same specific flow rate with about 6 liters of water, the effluent passing upflow through the anion exchanger. A synthetic sugar juice is prepared by dissolving 53 grams of sodium chloride, 10 grams of magnesium chloride, 8 grams of magnesium sulfate, 2 grams of calcium chloride and 7600 grams of sucrose in sufficient water to make 10 gallons (38 liters) of solution. This solution (38 liters) is then passed down flow at a rate of about 200 milliliters per minute through the anion exchanger and collected. Carbon dioxide gas is blown in through a sparger at a rate of about 1 liter per minute until the pH is between about 9 and about 10. Approximately 24 liters of carbon dioxide are absorbed. The carbonated sugar solution is then passed upflow through the cation exchanger resin at such a rate that the resin bed is expanded sufficiently to permit a substantial fraction of the strontium carbonate formed to pass through and out of the bed. We have found that at room temperature a flow rate of about 5 milliliters per minute per square centimeter is usually adequate. The product sugar syrup and strontium carbonate are separated by vacuum filtration. It is found that the conductivity of the separated sugar solution is less than 1250 micromhos per centimeter and has therefore been substantially purified. The resins are rinsed with water to remove absorbed sugar. The cation exchanger is substantially purged of strontium carbonate by recirculating a mixture of water and carbon dioxide upflow for several minutes. The liquid flow rate is about 100 milliliters per minute and the carbon dioxide rate is about 500 milliliters per minute. The resin is then drained and both columns are regenerated with strontium hydroxide slurry as described above.

EXAMPLE 3.—$BaCO_3$ AS THE SCAVENGING AGENT

About 815 milliliters of hydrogen form sulfonated crosslinked polystyrene cation exchange resin marketed by the Rohm and Haas Company (Philadelphia, Pa.) under the trade-name Amberlite 200 and about 1000 milliliters of hydroxide form quaternary ammonium containing crosslinked polystyrene anion exchange resin marketed by Dow Chemical Co., (Midland, Mich.) under the trade-name Dowex 21 K are mixed together and placed in a column having a total volume of about 3500 milliliters. A synthetic brackish water prepared in accordance with Example 1, Part A is passed downflow at a rate of about 400 milliliters per minute until the conductivity of the combined effluent is greater than about 1250 micromhos per centimeter. The resin is then regenerated by passing about 6 liters of a 9.5 percent (as $Ba(OH)_2$) slurry of finely divided barium hydroxide powder upflow at such a rate that the resin bed is expanded sufficiently to permit substantially all of the particulate matter in the slurry to pass through the bed. We have found that at room temperature a flow rate of about 20 milliliters per minute per square centimeter of resin cross-section is generally adequate though it appears that occasional fluctuations to 25 or 30 milliliters per minute assist in disengaging the slurry from the resin. The resin is drained, flushed from the column with water into a kettle in which it is stirred vigorously with rinse water. The resulting suspension is poured onto a screen having a mesh size sufficiently fine to retain the resin but sufficiently coarse to allow the barium hydroxide particles to pass through. The resin is then flushed back into the column and allowed to remain covered with water. The synthetic brackish water is passed upflow through the column at a rate of about 200 milliliters per minute accompanied by a flow of carbon dioxide gas. The flow of the latter is adjusted to maintain the pH of the liquid effluent from the column in the range of 7 to 9. The column is judged to be exhausted when the conductivity of the combined effluent from the column has risen to more than 1250 micromhos per centimeter. The volume of effluent at the point is found to be about 34 liters. Approximately 24 liters of carbon dioxide are absorbed. The pH of the effluent is adjusted to 10 with either barium hydroxide or carbon dioxide and the effluent is filtered. The resin is flushed from the column with synthetic brackish water into a kettle in which it is agitated to free barium carbonate. The resulting suspension is then poured onto the screen mentioned above to recover the resin which is flushed back into the column. After draining the resin is ready for regeneration.

The embodiments of the invention in which an exclusive property or privilege is claimed are defined as follows:

1. The process of deionizing an aqueous feed solution having dissolved ionized substances therein comprising intimately contacting said aqueous solution with cation and anion exchangers, the said cation resin exchanger being in the alkaline earth metal form for exchanging a substantial fraction of the cations in said aqueous solution for said alkaline earth metal ions selected from the group consisting of calcium, strontium, barium, and mixtures thereof the said anion resin exchanger being in the carbonate form for exchanging a substantial fraction of the anions in said aqueous solution for said carbonate ions thereby resulting in the formation of at least an insoluble alkali earth metal carbonate, separating at least part of said resulting carbonate from said aqueous solution and subsequently regenerating said spent resins.

2. The process of claim 1 characterized in that the deionization of the aqueous solution is effected in a resin bed operated in a turbulent mode to mechanically free a substantial amount of said carbonate precipitate from said resin and subsequently removing the freed precipitate from the resulting aqueous solution.

3. The process of claim 2 characterized in that said carbonate precipitate remaining in the resin bed after turbulent operation is removed therefrom by supercarbonating with additional carbon dioxide to result in the formation of soluble bicarbonate compounds.

4. The process of claim 1 characterized in that said deionization and regeneration steps are effected while the resins are in a mixed bed form.

5. The process of claim 1 characterized in that the said deionization and regeneration steps are effected while the anion and cation exchangers are in separate beds.

6. The process of claim 1 characterized in that the regeneration of said spent resin is effected by contact with a slurry comprising the hydroxide of said alkaline earth metal ions with subsequent carbonation by use of gaseous $CO_2$.

7. The process of claim 6 characterized in that the hydroxyl form anion resin is carbonated by treatment with gaseous carbon dioxide.

8. The process of claim 6 characterized in that the said carbonation step is effected simultaneously with the deionization step by adding gaseous carbon dioxide into said aqueous feed solution to be demineralized.

9. The process of claim 8 characterized in that the feed water is carbonated after passage through the hydroxyl form anion resin but prior to passage through the alkaline metal form cation resin.

10. The process of claim 8 characterized in that the feed water containing carbon dioxide is first passed through the anion exchange resin prior to passage through the cation exchange resin.

11. The process of deionizing an aqueous solution having dissolved ionized substances therein comprising, contacting an anion exchange resin in substantially the hydroxide form with gaseous carbon dioxide thereby forming carbonate anions, contacting said aqueous solution with said anion resin and with a cation exchange resin in substantially the form of alkaline earth metal cations selected from the group consisting of calcium, strontium, barium and mixtures thereof whereby a substantial fraction of the cations in said solution are exchanged for said alkaline earth metal cations and a substantial fraction of the anions in said solution are exchanged for carbonate anions resulting in the formation of precipitates of alkaline earth carbonates, separating said resins from said solution and precipitate, separating at least part of said carbonate precipitate from said solution and subsequently contacting said cation exchange and anion exchange resins with a slurry of the hydroxide of said alkaline earth metal cations to convert said resins respectively substantially to the alkaline earth metal cation and the hydroxide form.

12. The process of claim 11 characterized in that regeneration is effected in a resin mixed bed and wherein the slurry of hydroxide is removed from said bed along with substantially all unabsorbed alkaline metal earth ions and hydroxyl ions prior to carbonation.

References Cited
UNITED STATES PATENTS 1,756,275    4/1930    Behrman _____ 210—28
3,420,773    1/1969    Selmeczi _____ 210—37X SAMIH N. ZAHARNA, Primary Examiner U.S. Cl. X.R.

210—30